(12) United States Patent
Yeh et al.

(10) Patent No.: US 6,628,597 B2
(45) Date of Patent: Sep. 30, 2003

(54) GUIDE RAIL ASSEMBLY FOR DISK DRIVE

(75) Inventors: Shih-Lin Yeh, Taoyuan (TW); Han-Chao Chen, Hsinchu (TW); Jui-Nan Chuang, Changhua (TW)

(73) Assignee: Lite-On It Corp. (TW)

( * ) Notice: Subject to any disclaimer, the term of this patent is extended or adjusted under 35 U.S.C. 154(b) by 173 days.

(21) Appl. No.: 09/944,980

(22) Filed: Aug. 31, 2001

(65) Prior Publication Data

US 2003/0043719 A1 Mar. 6, 2003

(30) Foreign Application Priority Data

Jun. 15, 2001 (TW) .......................................... 90210097

(51) Int. Cl.⁷ .............................................. G11B 33/02
(52) U.S. Cl. ..................... 369/75.2; 369/77.1; 369/249
(58) Field of Search ............................. 369/75.2, 30.99, 369/249, 77.1

(56) References Cited

U.S. PATENT DOCUMENTS

| | | | | |
|---|---|---|---|---|
| 5,119,357 A | * | 6/1992 | Tsuruta et al. | 369/75.2 |
| 5,555,227 A | * | 9/1996 | Kurosu | 369/30.96 |
| 5,691,969 A | * | 11/1997 | Fujisawa | 369/77.1 |
| 5,844,874 A | * | 12/1998 | Saito et al. | 369/75.1 |

* cited by examiner

*Primary Examiner*—David L. Ometz
*Assistant Examiner*—Mark Blouin
(74) *Attorney, Agent, or Firm*—Raymond Sun

(57) ABSTRACT

A guide rail assembly for use with a disk drive has a first rail that has a raised ridge with a wavy upper edge and a wavy lower edge. The assembly also has a second rail having a channel defined therein, with the channel having a wavy upper wall and a wavy lower wall. The raised ridge of the first rail is positioned for reciprocating movement inside the channel of the second rail.

19 Claims, 6 Drawing Sheets

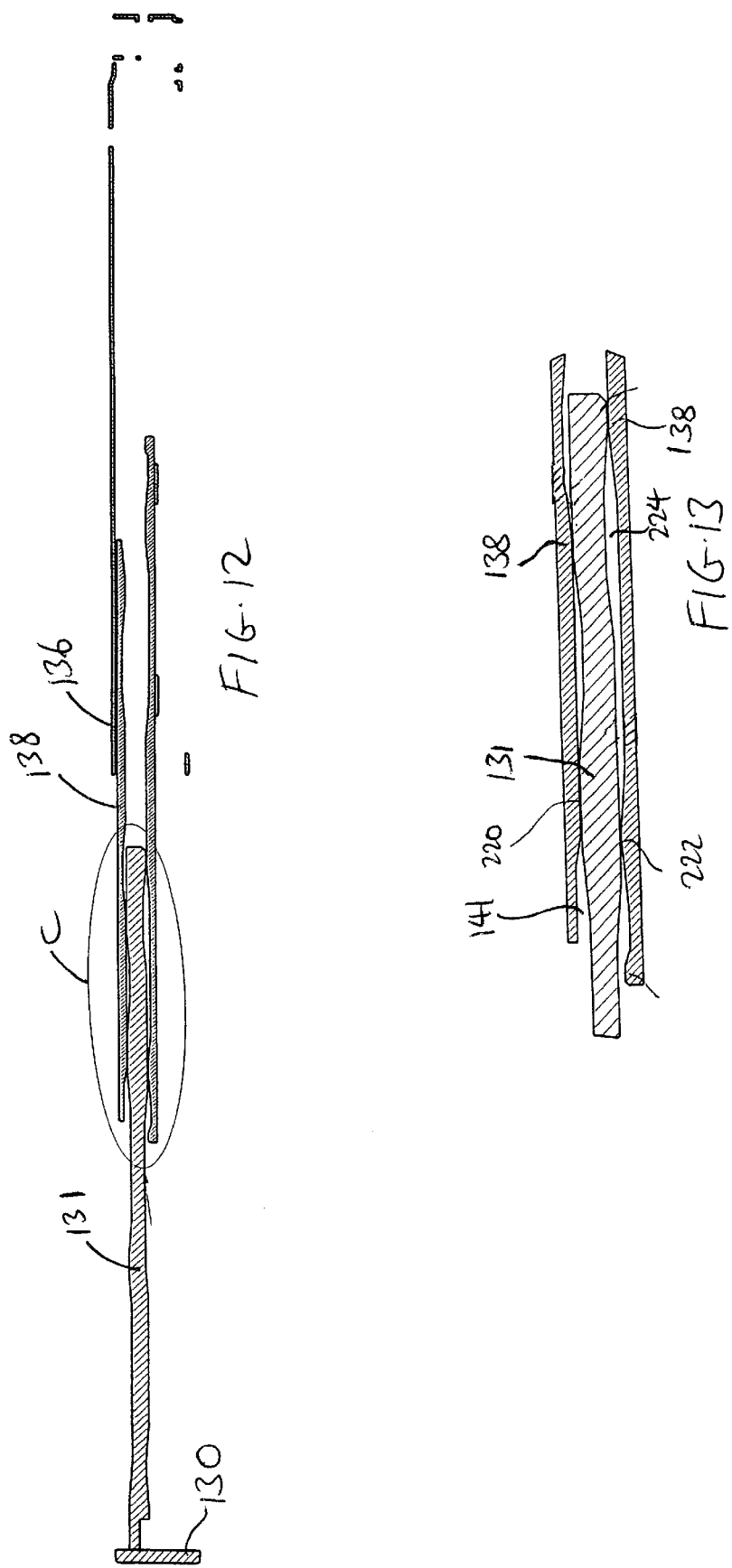

GUIDE RAIL ASSEMBLY FOR DISK DRIVE

BACKGROUND OF THE INVENTION

1. Field of the Invention

The present invention generally relates to disk drives, and more particularly, to a guide rail assembly for use in a disk drive, the guide rail assembly minimizing vibrations between the tray and the housing when the tray is secured inside the housing during a play mode.

2. Description of the Prior Art

CD-ROM and DVD disk drives are well-known. For example, CD-ROM disk drives are commonly used within a notebook-size personal computer. A CD-ROM is a type of an optical disk which is capable of storing a large amount of data including programs or database data. The CD-ROM, which is placed in the CD-ROM disk drive, is accessed by a laser pickup of the CD-ROM disk drive so that data is reproduced from the CD-ROM.

FIG. 1 illustrates a conventional CD-ROM disk drive 20, which includes a tray 22 which is slidably positioned in a housing 23 of the disk drive 20 for reciprocating movement in both an ejecting direction A and an inserting direction B. The housing 23 has a top cover and a bottom cover 28, and the tray 22 includes a chassis that is secured (e.g., by screws) to the bottom of the tray 22. When a disk (not shown) is loaded into the disk drive 20, the tray 22 (with the disk being placed thereon) is manually pushed into the disk drive 20 in the inserting direction B and set at a loaded position in the disk drive 20.

In the disk drive 20, a drive unit (not shown) is provided below the tray 22. A turntable 24 which is rotated by a spindle motor (not shown) is attached to the drive unit, with the disk that is placed on the tray 22 being held on the turntable 24. An optical pickup 26 is coupled to the drive unit for accessing the disk to read out data from the disk. A pickup moving unit (not shown) is also coupled to the drive unit for moving the optical pickup 26 in a radial direction of the disk.

An ejection unit is provided for ejecting the tray 22 from the housing 23. A front bezel 30 is attached to a front end of the tray 22, and includes a rectangular opening which extends laterally in the front bezel 30. An ejection switch 32 is attached to the tray 22 and provided in the rectangular opening of the front bezel 30. When the ejection switch 32 is manually pressed, the tray 22 is ejected from the housing 23 to an ejected position, where the tray 22 at the ejected position can be further pulled out from the housing 23 to a disk-change position by the user. When the tray 22 is set at the disk-change position (as shown in FIG. 1), the tray 22 is completely outside the confines of the housing 23 and the disk on the tray 22 can be removed and replaced with a new one.

A guide rail assembly is provided to guide the movement of the tray 22 in either the inserting direction or the ejecting direction. FIGS. 1 and 2 illustrate the guide rail assembly of the conventional disk drive 20 of FIG. 1. The guide rail assembly includes a pair of movable rails 34, a pair of guide rails 36, and a pair of slide rails 38. One movable rail 34 is secured to each of the opposing sides of the tray 22 and arranged such that each movable rail 34 is movable with respect to the bottom cover 28. Each guide rail 36 is secured to each of the opposing sides of the bottom cover 28, and each guide rail 36 is arranged on the bottom cover 28 so that the guide rail 36 can extend in directions parallel to the corresponding movable rail 34. Each guide rail 36 has a channel that receives a corresponding slide rail 38 therein, and each slide rail 38 also has a channel that receives a corresponding movable rail 34 therein. Each slide rail 38 is movably arranged between the corresponding movable rail 34 and guide rail 36 so that the slide rail 38 is movable with respect to both the movable rail 34 of the tray 22 and the guide rail 36 of the bottom cover 28. In other words, there is a relative displacement between each set of slide rail 38 and movable rail 34, and between each set of slide rail 38 and guide rail 36. Each set of rails 38+34 and 38+36 slides along its own defined paths.

As shown in FIGS. 1 and 2, the connections between the rails 34, 36, 38, and the support provided by these rails 34, 36, 38, play an important role when the tray 22 and its play module 40 are completely slid out of the confines of the housing 23 of the disk drive 20. Regardless of whether the tray 22 is in the play mode (i.e., with the tray 22 completely retained inside the housing 23) or in the disk-change mode (i.e., with the tray 22 completely pulled out of the confines of the housing 23), there must be sufficient clearance between each of the rails in the two sets of rails (e.g., sufficient clearance between rails 34 and 38, and between the rails 36 and 38) to allow for smooth reciprocating movement of the tray 22. However, as best shown in FIG. 2, when the tray 22 is in the play mode, the movable rails 34 on the sides of the tray 22 virtually contact the walls of the channel of the sliding rails 38, so there is usually insufficient clearance to offset any vibrations that may be caused by the disk drive 20. For example, in such a situation, vibrations from the external environment can be transferred via the housing 23 and the rails 36, 38, 34 (in this order) to the tray 22 and its play module 40 during the play mode, which can seriously affect the performance of the disk drive 20. As another example, vibrations from the play module 40 and optical pickup 24 can be transferred via the tray 22 and the rails 34, 38, 36 (in this order) to the external environment. The user will be uncomfortable when the housing 23 vibrates, and such vibrations can have a negative effect on the other parts of the notebook computer. In other words, this lack of a sufficient clearance between the rails 34, 38, 36 may worsen the effect of any vibrations that may be generated.

Widening the clearances of the channels in the rails 36 and 38 does not necessarily provide an adequate solution to this problem, because an excessively large clearance may give rise to multi-directional shaking of the tray 22, and may have a negative impact on the smooth sliding motion of the movable rails 34 in the channel of the slidable rails 38.

Thus, there remains a need for a guide rail assembly that minimizes the effects of vibrations, and which minimizes the spread of vibrations.

SUMMARY OF THE INVENTION

It is an object of the present invention to provide a guide rail assembly that minimizes the effects of vibrations, and which minimizes the spread of vibrations.

It is another object of the present invention to provide a guide rail assembly that promotes smooth movement by the tray when the tray is being slid between the play mode and the disk-change mode.

The objects of the present invention may be accomplished by providing a guide rail assembly for use with a disk drive, the assembly having a first rail that has a raised ridge with a wavy upper edge and a wavy lower edge, and a second rail having a channel defined therein, with the channel having a wavy upper wall and a wavy lower wall. The raised ridge of the first rail is positioned for reciprocating movement inside the channel of the second rail.

BRIEF DESCRIPTION OF THE DRAWINGS

FIG. 12 is a cross-sectional view of the guide rail assembly of the disk drive of FIG. 3 with the tray completely ejected to the disk-change mode.

FIG. 13 is an enlarged cross-sectional view of the portion C of the guide rail assembly of FIG. 12.

DETAILED DESCRIPTION OF THE PREFERRED EMBODIMENTS

Figure 1:
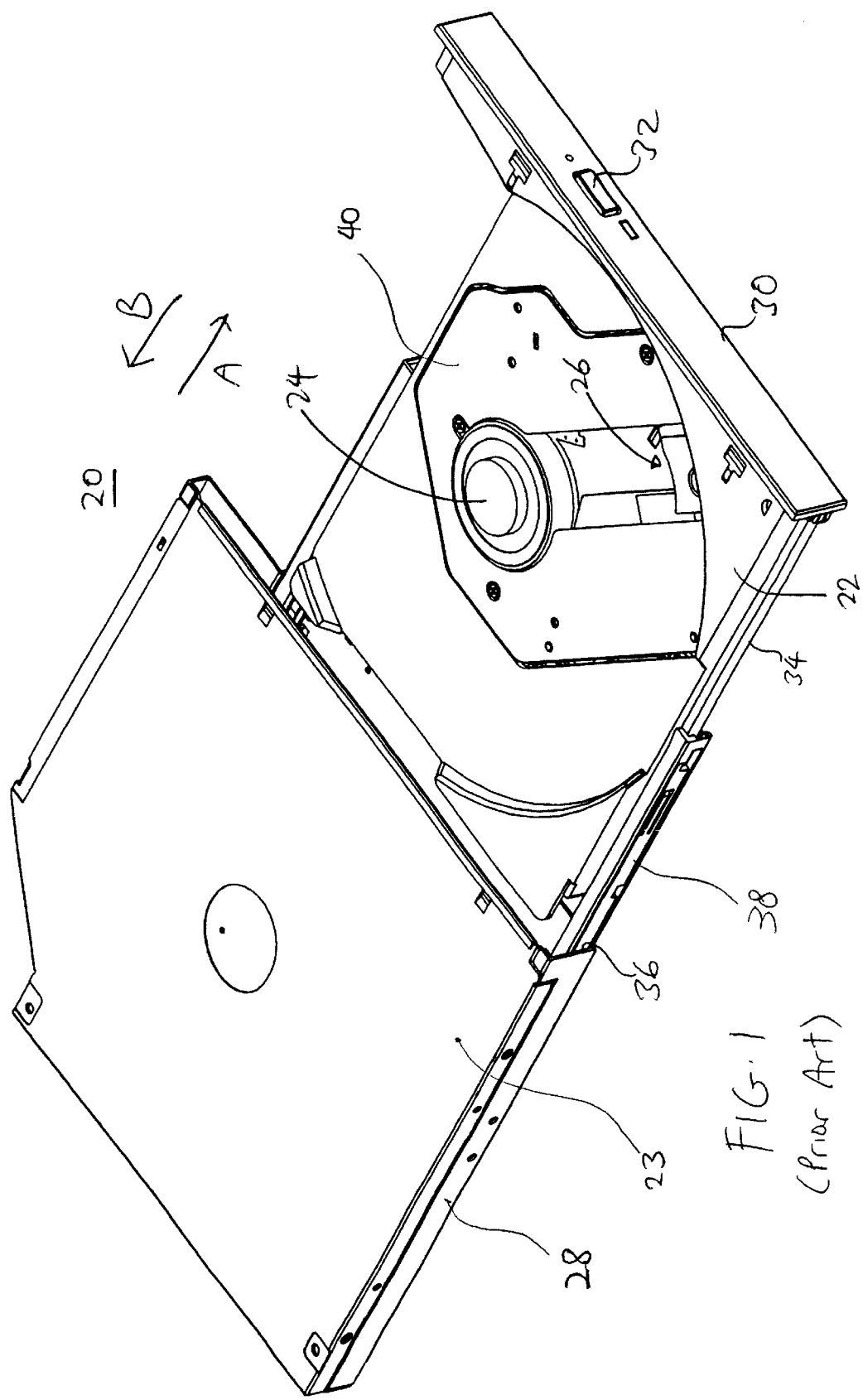
FIG. 1 is a top perspective view of a conventional disk drive.
Figure 2:
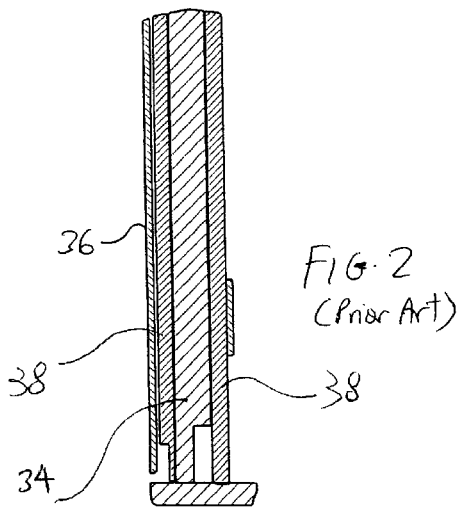
FIG. 2 is an expanded cross-sectional view of a front portion of the guide rail assembly of the disk drive of FIG. 1.

The following detailed description is of the best presently contemplated modes of carrying out the invention. This description is not to be taken in a limiting sense, but is made merely for the purpose of illustrating general principles of embodiments of the invention. The scope of the invention is best defined by the appended claims. In certain instances, detailed descriptions of well-known devices and mechanisms are omitted so as to not obscure the description of the present invention with unnecessary detail.

The present invention provides a guide rail assembly where the interacting rails or guides are provided with wavy configurations that (1) allow for free and smooth movement by the tray when the tray is being slid between the play mode and the disk-change mode, and (2) provide a clearance between the rails that is small enough to prevent shaking of the tray during the play mode, yet is large enough to prevent the transfer of vibrations to and from the tray during the play mode.

It will be appreciated by those skilled in the art that the guide rail assembly of the present invention is applicable to any disk drive which has a tray that is reciprocated along a track from a first position where the tray is completely retained inside the housing, to a second position where the tray is extended partially or completely out of the housing. The guide rail assembly of the present invention is not limited to use with CD-ROM drives and DVD drives. However, given the benefits realized by the guide rail assembly of the present invention, it is especially appropriate for use in slim-type DVD or CD-ROM disk drives.

FIGS. 3–7 illustrate a disk drive 120 according to one non-limiting embodiment of the present invention. The disk drive 120 has a tray 122, a housing 123, a turntable 124, an optical pickup 126, a front bezel 130 (with an ejection switch 132), and a play module 140 that are the same in construction and operation as the tray 22, the housing 23, the turntable 24, the optical pickup 26, the front bezel 30, and the play module 40 described above for the disk drive 20.

A guide rail assembly is also provided to guide the movement of the tray 122 in either the inserting direction B or the ejecting direction A. The guide rail assembly includes a pair of movable rails 134, 135, a pair of guide rails 136, and a pair of slide rails 138, 139. The left and right movable rails 134 and 135, respectively, are formed as part of the opposing left and right sides 142 and 144, respectively, of the tray 122 (e.g., by screws) and arranged such that each movable rail 134, 135 is movable with respect to the bottom cover 128. Each guide rail 136 is formed as part of each of the opposing sides of the bottom cover 128. Each slide rail 138, 139 is movably positioned between the corresponding movable rail 134, 135 and guide rail 136 so that the slide rail 138, 139 is movable with respect to both the corresponding movable rail 134, 135 of the tray 122 and the corresponding guide rail 136. In other words, there is a relative parallel displacement between each set of slide rail 138, 139 and movable rail 134, 135, and between each set of slide rail 138, 139 and guide rail 136. Each set of rails slides along its own defined paths. The structure and interaction between each slide rail 138, 139 and its corresponding guide rail 136 is the same as for the slide rail 38 and guide rail 36 in the conventional disk drive 20, but the structure and interaction between each slide rail 138, 139 and its corresponding movable rail 134, 135, respectively, is different.

Figure 4:
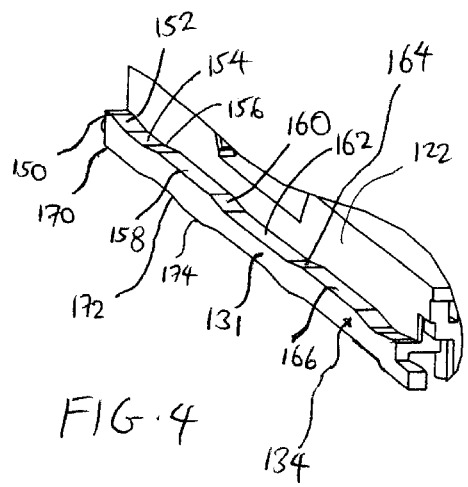
FIG. 4 is an enlarged perspective view of the left movable rail of the tray (when viewed from the front bezel of the tray) in the disk drive of FIG. 3.
Figure 5:
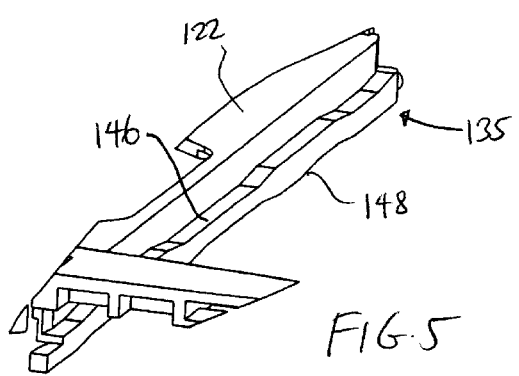
FIG. 5 is an enlarged perspective view of the right movable rail (when viewed from the front bezel of the tray) of the tray in the disk drive of FIG. 3.
Figure 3:
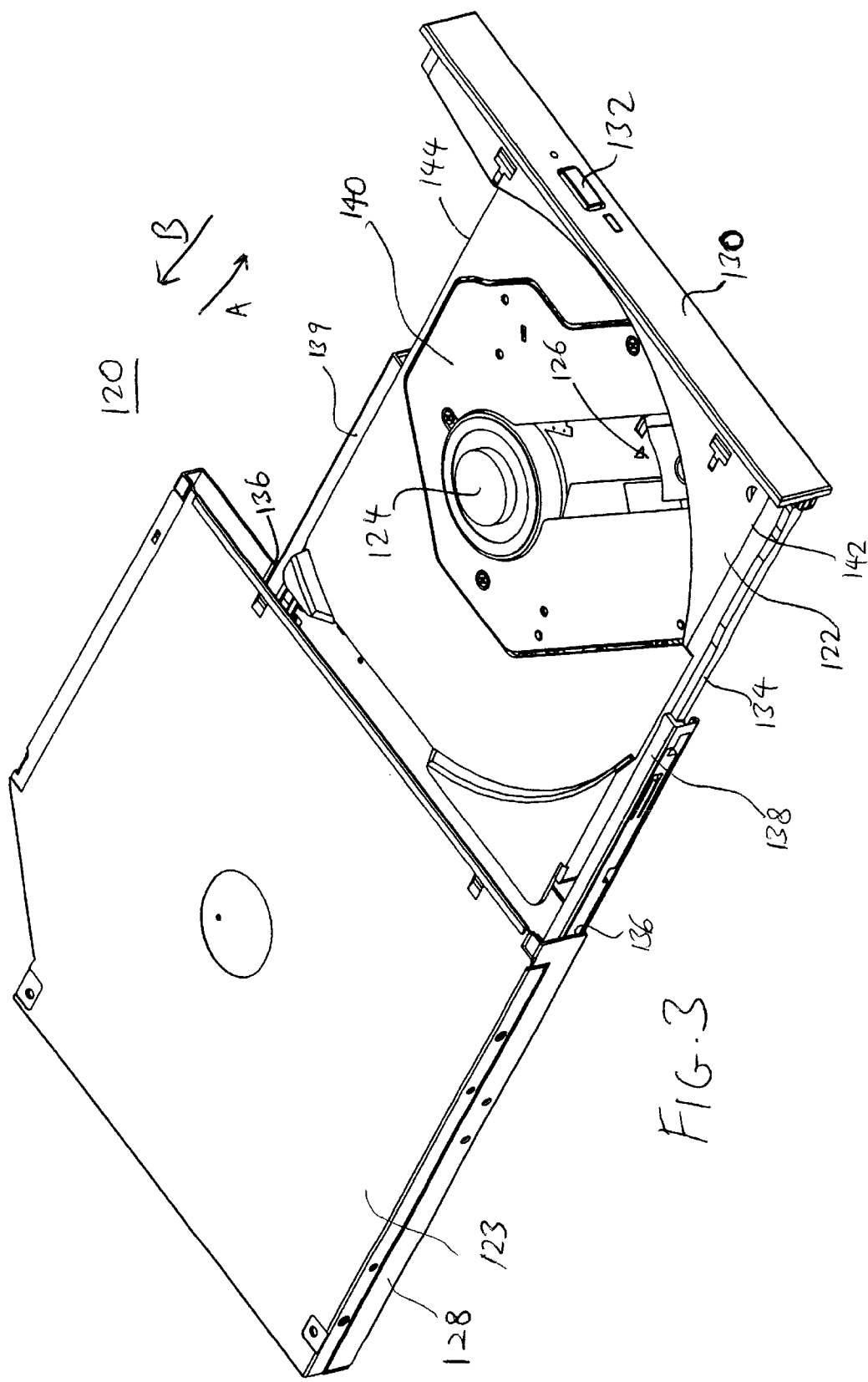
FIG. 3 is a top perspective view of a disk drive according to one non-limiting embodiment of the present invention.

FIGS. 4 and 5 illustrate the movable rails 134 and 135, respectively. Since both movable rails 134, 135 have essentially the same structure and configuration, only the left movable rail 134 will be described in greater detail. Each movable rail 134 and 135 is formed as a raised ridge 131 from the corresponding side 142 and 144, respectively, of the tray 122. In the conventional disk drive 20, the raised ridge that forms the movable rail 34 has a straight upper edge and a straight lower edge, so that the distance between the upper and lower edges is uniform throughout the length of the ridge. In contrast, the raised ridge 131 that forms each movable rail 134, 135 has a wavy upper edge 146 and a wavy lower edge 148. By "wavy", it is meant that the edge 146, 148 is not straight, and has a number of undulations (also referred to herein as "portions" or "surfaces") that extend inwardly and outwardly from the edge 146 or 148. Another way to view these undulations is to consider them to be recessed regions (for the inwardly extending portions) and raised regions (for the outwardly extending portions). For example, the upper edge 146 of the ridge 131 of the left rail 134 has a generally longitudinal portion 150 that transitions via an angled ramp 152 to an inwardly extending portion 154, that then transitions via another angled ramp 156 to another outwardly extending portion 158. This pattern repeats itself along the upper edge 146; for example, the outwardly extending portion 158 transitions via an angled ramp 160 to an inwardly extending portion 162, that then transitions via another angled ramp 164 to another outwardly extending portion 166, and so on. The lower edge 148 has a similar pattern of inwardly and outwardly extending portions. For example, the lower edge 148 of the ridge 131 of the left rail 134 has a generally longitudinal portion 170 that transitions to an inwardly extending portion 172, that then transitions to another outwardly extending portion 174, and so on. The right rail 135 can have the same (or even a different) pattern of inwardly and outwardly extending portions for its upper and lower edges 146, 148. The wavy patterns on the upper and lower edges 146, 148 can be symmetrical about the longitudinal axis of the ridge 131 that forms the rail 134, 135, and can also be assymetrical about this longitudinal axis. In addition, the inwardly and outwardly extending portions can be straight or curved. As yet another example, the inwardly and outwardly extending portions can form a zig-zag or triangular pattern.

Figure 6:
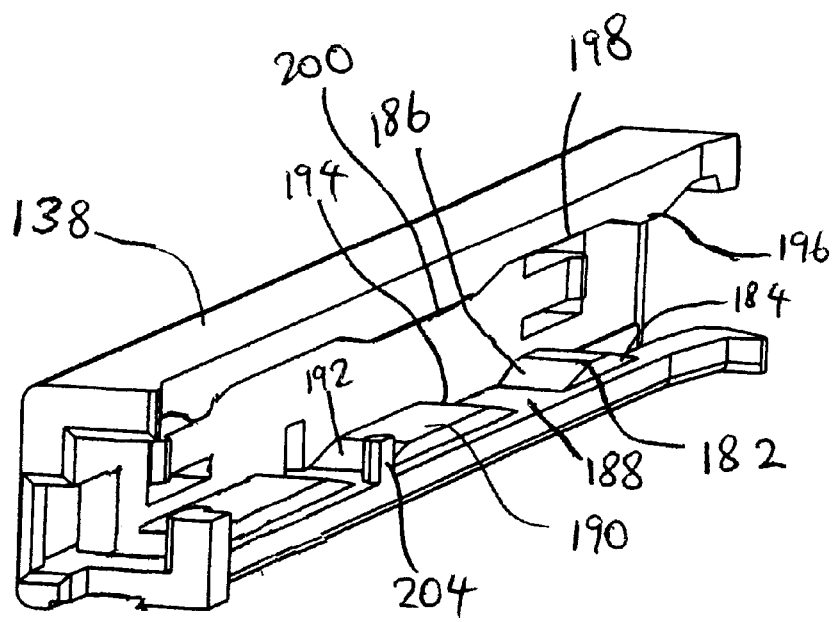
FIG. 6 is an enlarged perspective view of the left slidable rail of the tray (when viewed from the front bezel of the tray) in the disk drive of FIG. 3.
Figure 7:
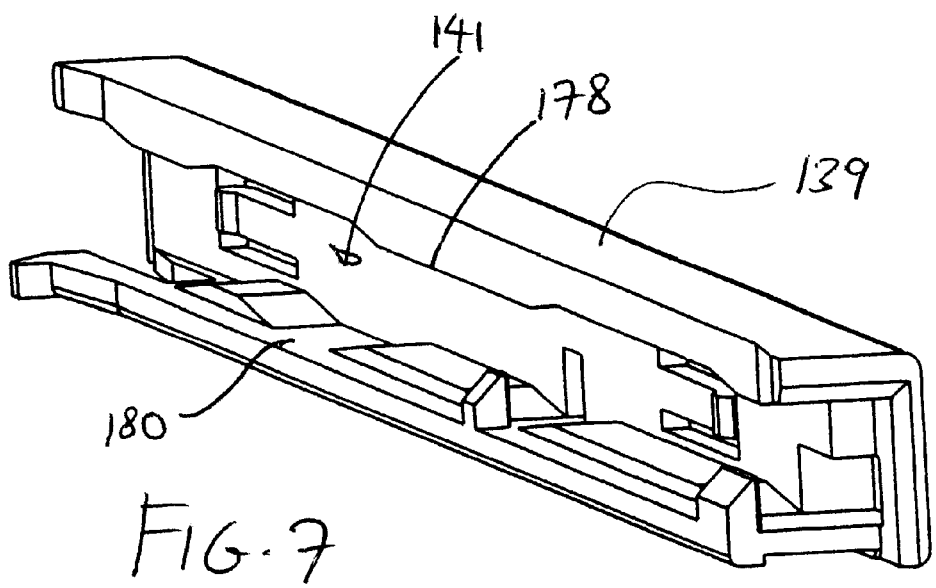
FIG. 7 is an enlarged perspective view of the right slidable rail of the tray (when viewed from the front bezel of the tray) in the disk drive of FIG. 3.

FIGS. 6 and 7 illustrate the slidable rails 138 and 139, respectively. Since both slidable rails 138, 139 have essentially the same structure and configuration, only the left slidable rail 138 will be described in greater detail. Each slidable rail 138 and 139 defines a channel 141. In the conventional disk drive 20, the channel that is defined by the slidable rail 38 has a straight upper wall and a straight lower wall, so that the distance between the upper and lower walls is uniform throughout the length of the channel. In contrast, the channel 141 that is defined by each slidable rail 138, 139 has a wavy upper wall 178 and a wavy lower wall 180. As with the movable rails 134, 135, "wavy" means that the wall 178, 180 is not straight, and has a number of undulations (also referred to herein as "portions" or "surfaces") that extend inwardly and outwardly from the wall 178, 180. For example, the lower wall 180 of the channel 141 of the left rail 138 has a raised region 182 that is flanked by two angled ramps 184 and 186. The raised region 182 transitions to a recessed region 188, which in turn transitions to another raised region 190 that is flanked by two angled ramps 192 and 194. This pattern repeats itself along the lower wall 180. The upper wall 178 has a similar pattern of recessed and raised regions. For example, the upper wall 178 of the channel 141 of the left rail 138 has a raised region 196 that transitions to a recessed region 198, that then transitions to another raised region 200, and so on. The right rail 139 can have the same (or even a different) pattern of raised and recessed regions for its upper and lower walls 178, 180. The wavy patterns on the upper and lower walls 178, 180 can be symmetrical about the longitudinal axis of the channel 141, and can also be assymetrical about this longitudinal axis. In addition, the raised and recessed regions can be straight or curved. As yet another example, the raised and recessed regions can form a zig-zag or triangular pattern. Posts 204 can be provided on the lower wall 180 to further constrain and control (e.g., guide) the movement of the corresponding rail 134 or 135 inside the channel 141.

Figure 8:
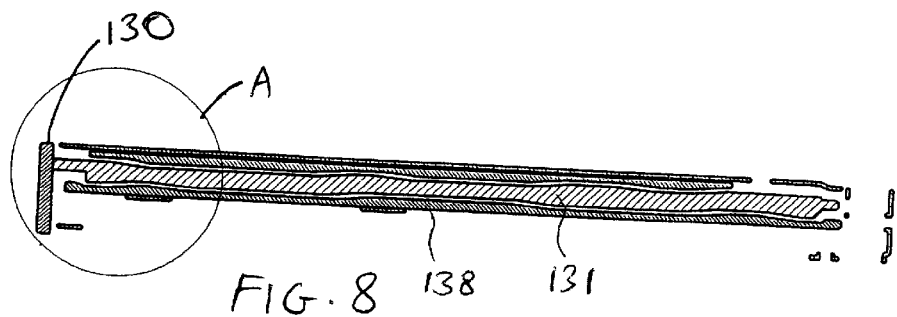
FIG. 8 is a cross-sectional view of the guide rail assembly of the disk drive of FIG. 3 during the play mode.
Figure 9:
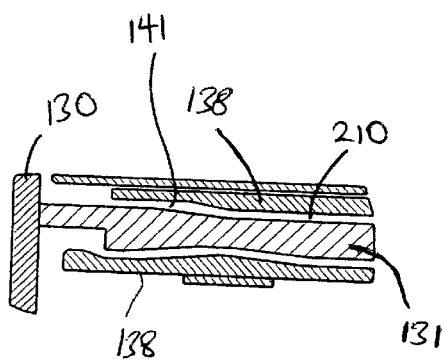
FIG. 9 is an enlarged cross-sectional view of the portion A of the guide rail assembly of FIG. 8.

As best illustrated in FIGS. 8–13, the ridge 131 that forms each movable rail 134, 135 is fitted inside, and slides in reciprocating fashion along, a corresponding channel 141 of a corresponding slidable rail 138, 139. First, FIGS. 8 and 9 illustrate the arrangement of one set of rails 134 and 138 when the tray 122 is in the play mode. As shown in FIGS. 8 and 9, the wavy ridge 131 that forms the movable rail 134 is snugly retained inside the wavy channel 141 that forms the slidable rail 138. A small clearance 210 is provided adjacent both the upper and lower edges 146, 148 throughout the channel 141. In other words, the distance (i.e., clearance) between the upper wall 178 and the upper edge 146, and between the lower wall 180 and the lower edge 148, is sufficiently small throughout the channel 141 to prevent the tray 122 from shaking when in the play mode, yet is sufficiently large throughout the channel 141 to effectively prevent (1) vibrations generated by the tray 122 from being transferred to the slidable rail 138 and then on to the housing 123, and (2) vibrations generated by the external environment from being transferred via the slidable rail 138 and movable rail 134 to the tray 122. According to one non-limiting embodiment of the present invention, this clearance 210 can be uniform throughout the length of the channel 141.

Figure 11:
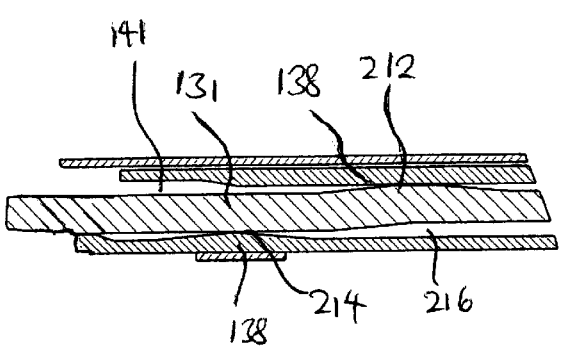
FIG. 11 is an enlarged cross-sectional view of the portion B of the guide rail assembly of FIG. 10.
Figure 10:
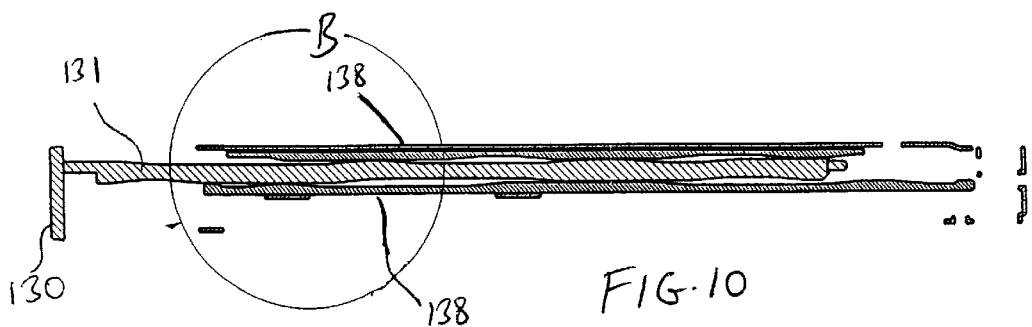
FIG. 10 is a cross-sectional view of the guide rail assembly of the disk drive of FIG. 3 with the tray partially ejected.

FIGS. 10 and 11 illustrate the arrangement of the set of rails 134 and 138 when the tray 122 has been ejected for a short distance along the rails 134, 138. As shown in FIGS. 10 and 11, a significant portion of the wavy ridge 131 that forms the movable rail 134 is still snugly retained inside a significant portion of the wavy channel 141 of the slidable rail 138. Here, instead of the small and uniform clearance 210, portions (e.g., see 212 and 214) of the upper and lower edges 146, 148 may contact portions of the upper and lower walls 178, 180, and some of the clearances (e.g., see 216) can be larger than the clearance 210. Since the greatest distance between any opposing locations of the upper and lower edges 146, 148 of the ridge 131 will always be equal to or less than the smallest distance between any opposing locations of the upper and lower walls 178, 180 of the channel 141, the ridge 131 of the rail 134 will always be able to slide smoothly and freely within the channel 141 of the rail 138. Vibrations do not pose as much of a concern during the ejection of the tray 122, so the larger clearance 216 and the contact regions 212 and 214 can be tolerated in this situation.

FIGS. 12 and 13 illustrate the arrangement of the set of rails 134 and 138 when the tray 122 has been completely ejected to the disk-change mode. As shown in FIGS. 12 and 13, a small portion of the wavy ridge 131 that forms the movable rail 134 is still snugly retained inside a small portion of the wavy channel 141 of the slidable rail 138. Here, similar to the partially-ejected position shown in FIGS. 10 and 11, portions (e.g., see 220 and 222) of the upper and lower edges 146, 148 may still contact portions of the upper and lower walls 178, 180, and some of the clearances (e.g., see 224) can still be larger than the clearance 210. As with the partially-ejected position shown in FIGS. 10 and 11, vibrations do not pose as much of a concern during the disk-change mode of the tray 122, so the larger clearance 224 and the contact regions 220 and 222 can also be tolerated in this situation.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A guide rail assembly for use with a disk drive, the assembly comprising:
   a first rail that has a raised ridge having a wavy upper edge and a wavy lower edge; and
   a second rail having a channel defined therein, the channel having a wavy upper wall and a wavy lower wall;
   wherein the raised ridge of the first rail is positioned for reciprocating movement inside the channel of the second rail.

2. The assembly of claim 1, wherein the wavy upper edge is adjacent to the wavy upper wall, and wherein the wavy lower edge is adjacent to the wavy lower wall.

3. The assembly of claim 2, wherein a first clearance is defined between the wavy upper edge and the wavy upper wall, and a second clearance is defined between the wavy lower edge and the wavy lower wall, when the first rail is completely retained inside the second rail.

4. The assembly of claim 3, wherein the first and second clearance are uniform throughout the channel.

5. The assembly of claim 3, wherein a third clearance is defined between the wavy upper edge and the wavy upper wall when the first rail is partially retained inside the second rail, and wherein the third clearance is larger than the first and second clearances.

6. The assembly of claim 3, wherein the wavy upper edge and the wavy upper wall contact each other at at least one location when the first rail is partially retained inside the second rail.

7. The assembly of claim 1, wherein the wavy upper edge and the wavy lower edge include a plurality of inwardly extending portions and a plurality of outwardly extending portions.

8. The assembly of claim 7, wherein the plurality of inwardly extending portions and the plurality of outwardly extending portions define different patterns for the wavy upper edge and the wavy lower edge.

9. The assembly of claim 1, wherein the wavy upper wall and the wavy lower wall include a plurality of raised regions and a plurality of recessed regions.

10. The assembly of claim 9, wherein the plurality of raised regions and the plurality of recessed regions define different patterns for the wavy upper wall and the wavy lower wall.

11. The assembly of claim 1, wherein the raised ridge has a longitudinal axis, and wherein the wavy upper edge is symmetrical to the wavy lower edge about the longitudinal axis.

12. The assembly of claim 1, wherein the raised ridge has a longitudinal axis, and wherein the wavy upper edge is assymmetrical to the wavy lower edge about the longitudinal axis.

13. The assembly of claim 1, wherein the channel has a longitudinal axis, and wherein the wavy upper wall is symmetrical to the wavy lower wall about the longitudinal axis.

14. The assembly of claim 1, wherein the channel has a longitudinal axis, and wherein the wavy upper wall is assymmetrical to the wavy lower wall about the longitudinal axis.

15. The assembly of claim 1, wherein the greatest distance between the wavy upper and lower edges is less than or equal to the smallest distance between the wavy upper and lower walls.

16. A disk drive, having a housing, a tray, and a guide rail assembly comprising:

a first rail provided on the tray, the first rail having a raised ridge having a wavy upper edge and a wavy lower edge; and a second rail provided for reciprocal movement with respect to the tray and the housing, the second rail having a channel defined therein, the channel having a wavy upper wall and a wavy lower wall;

wherein the raised ridge of the first rail is positioned for reciprocating movement inside the channel of the second rail.

17. The disk drive of claim 16, wherein the wavy upper edge is adjacent to the wavy upper wall, and wherein the wavy lower edge is adjacent to the wavy lower wall.

18. The disk drive of claim 16, wherein the wavy upper edge and the wavy lower edge include a plurality of inwardly extending portions and a plurality of outwardly extending portions.

19. The disk drive of claim 16, wherein the wavy upper wall and the wavy lower wall include a plurality of raised regions and a plurality of recessed regions.

* * * * *